United States Patent
Kopp

(10) Patent No.: US 9,012,863 B2
(45) Date of Patent: Apr. 21, 2015

(54) PIXILATED NEUTRON DETECTOR

(71) Applicant: Daniel Kopp, Knoxville, TN (US)

(72) Inventor: Daniel Kopp, Knoxville, TN (US)

(73) Assignee: Ordela, Inc., Oak Ridge, TN (US)

( * ) Notice: Subject to any disclaimer, the term of this patent is extended or adjusted under 35 U.S.C. 154(b) by 0 days.

(21) Appl. No.: 13/622,188

(22) Filed: Sep. 18, 2012

(65) Prior Publication Data

US 2014/0077092 A1 Mar. 20, 2014

(51) Int. Cl.
*G01T 3/00* (2006.01)

(52) U.S. Cl.
CPC ........................................ *G01T 3/00* (2013.01)

(58) Field of Classification Search
CPC ........... G01T 3/008; G01T 3/00; G01T 1/185; G01T 1/18; G01T 1/2935
USPC ..................................................... 250/370.05
See application file for complete search history.

(56) References Cited

U.S. PATENT DOCUMENTS

| | | | |
|---|---|---|---|
| 6,545,281 B1 * | 4/2003 | McGregor et al. | 250/370.05 |
| 7,078,705 B1 * | 7/2006 | Ianakiev et al. | 250/390.01 |
| 7,952,078 B2 | 5/2011 | McCormick et al. | |
| 8,115,179 B2 * | 2/2012 | Riedel et al. | 250/392 |
| 8,129,690 B2 | 3/2012 | McCormick et al. | |
| 2006/0157654 A1 * | 7/2006 | Frank | 250/370.05 |
| 2010/0258737 A1 * | 10/2010 | McCormick et al. | 250/390.01 |
| 2011/0068275 A1 * | 3/2011 | McCormick | 250/391 |
| 2013/0048871 A1 * | 2/2013 | Lustig | 250/390.01 |
| 2013/0119261 A1 * | 5/2013 | McKinny et al. | 250/391 |

OTHER PUBLICATIONS

Ginhoven, et al, "Alternative Neutron Detector Technologies for Homeland Security," US Dept of Homeland Security PIET-43741-TM-840, Rev 0, 06-09-2009, PNNL, Richland, WA 99352.
Kopp, "Large-Area Boron-10 Lined Pixel-Cell Detector for High Neutron Efficieny, Low Gamma Sensitivity, and Good Resolution," Topic 15, Subtopic A, Submitted: Sep. 19, 2011.
Knoll, "Radiation Detectopm amd Measurement," Chap 14, 3rd Ed. John Wiley and Sond, New York, 2002.
Crane et al, "Neutron Detectors," Chap 13, Passive Nondestructive Assay of Nuclear Materials, ed, Reilly, D. et al., Technical Report NUREG/CR-5550; LA-UP-90-732, LANL, NM 1991.
Tomov,et al, "Development of a Portable Thermal Neutron . . . " Proc.SPIE7119 Optics and Photonics for Counterterroism and Crime Fighting, Oct. 3, 2008.
Wang, et al, "Multi-layer Boron Thin-Film Detectors for Neutrons" Nuclear Instruments and Methods in Physics Research A, vol. 652, Iss 1, p. 323-325, Mar. 5, 2010.

* cited by examiner

*Primary Examiner* — Marcus Taningco
(74) *Attorney, Agent, or Firm* — Pitts & Lake, P.C.

(57) ABSTRACT

Disclosed is a pixilated neutron detector including one or more pixel-cells defined by a plurality of perimeter walls, the pixel cells including a cathode and an anode, the cathode being at least one wall of the pixel-cell, the cathode being lined with an interaction material, the anode disposed inside the pixel-cell, the cathode and anode structured to provide an electrical field within the pixel-cell to collect charged particles released by neutrons interacting with the interaction material lining, and a signal processing chain communicably coupled to each of the one or more pixel cells to transmit a signal indicative of a neutron interaction event within the pixel-cell, the signal processing chain including analog signal processing electronics communicably coupled to digital signal processing electronics.

20 Claims, 6 Drawing Sheets

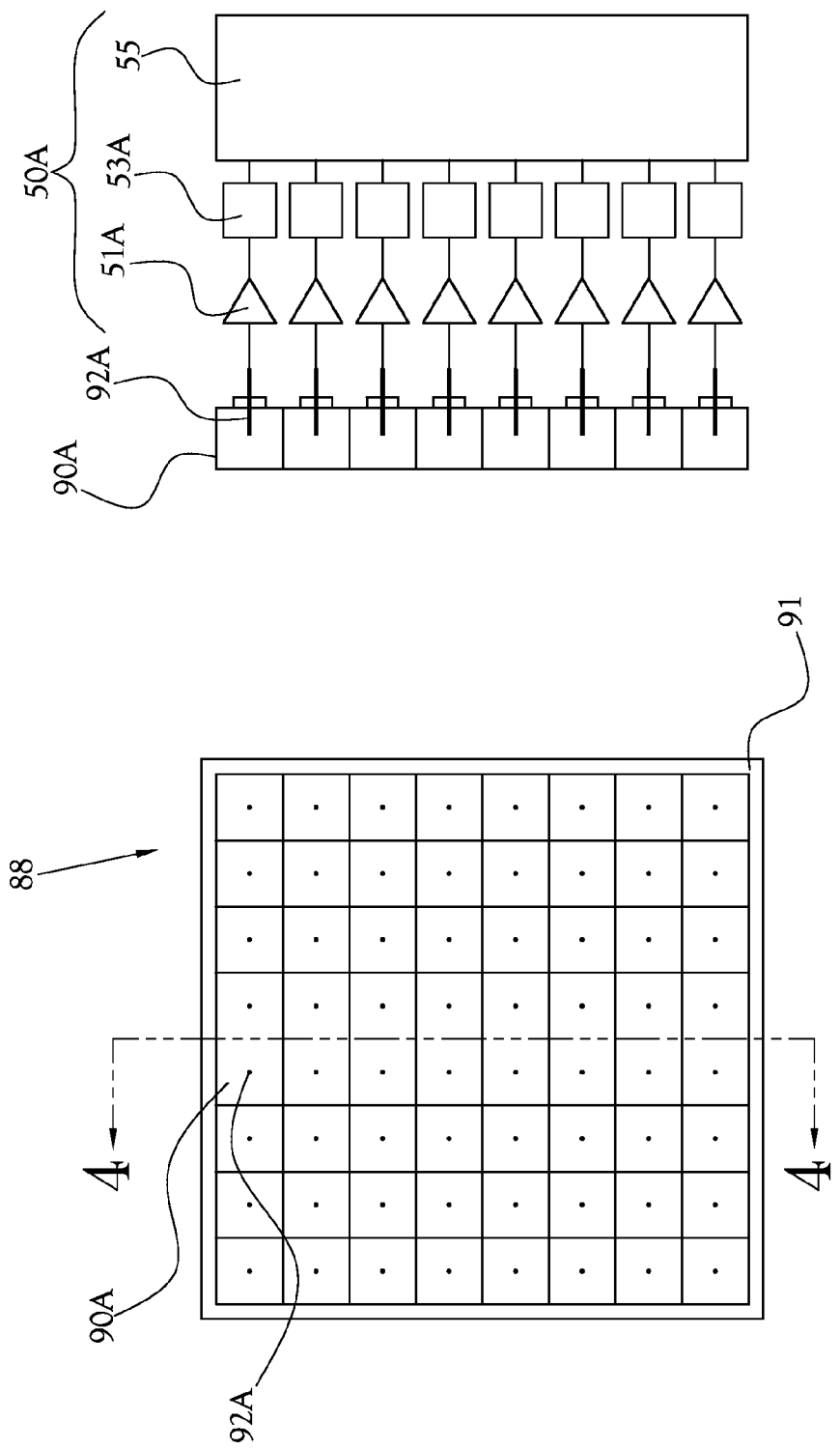

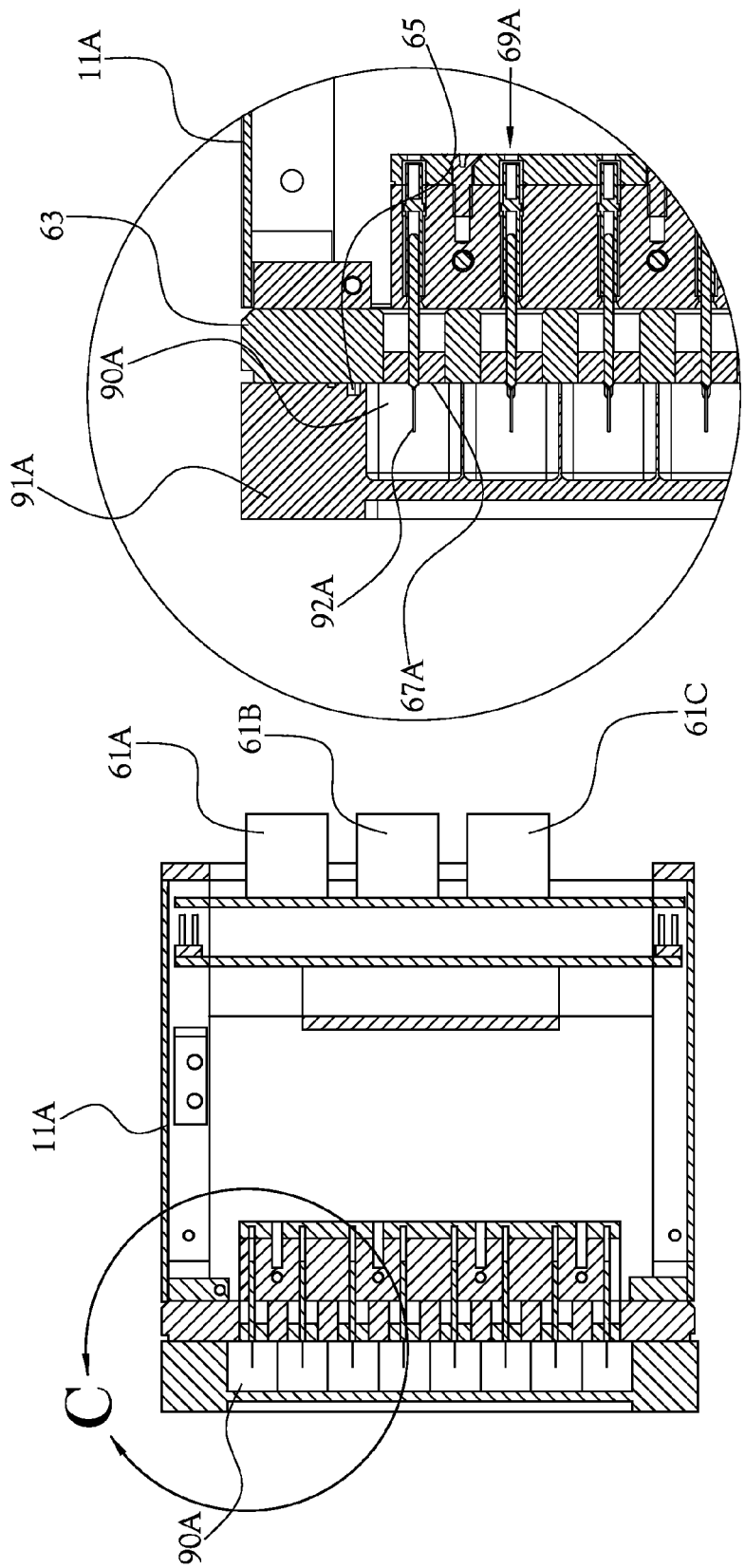

PIXILATED NEUTRON DETECTOR

CROSS-REFERENCE TO RELATED APPLICATIONS

N/A

FIELD OF INVENTION

The present inventive concept relates generally to radioactivity, and more particularly to a system and method for detecting events indicative of radioactivity, namely nuclear reactions involving neutrons.

BACKGROUND

The detection of neutrons is important in many applications ranging from basic materials research to national security. Neutrons have no electrical charge and can penetrate far deeper into matter than x-rays, gamma rays, charged particles, or visible light. For this reason, neutrons offer certain advantages for the detection of radioactive materials.

The detection of neutrons in matter is primarily based on indirect methods. Neutrons can be detected through nuclear reactions involving an interaction material whereby the neutron is absorbed via electromagnetic, charged, neutral, and/or fission means, or converted/scattered via elastic and/or inelastic means. This results in a prompt nuclear reaction—the products of which can include protons, alpha particles, gamma rays, fission fragments, etc. These reaction products can then be collected and recorded as indicative that one or more interaction events occurred. Known interaction materials effective in the detection process include helium-3, lithium-6, boron-10, boron-trifluoride ("BF-3"), and/or fissile uranium.

Various measurement results are of interest in neutron detection, including the location of the interaction, the time of the interaction, and the energy of the neutron involved in the interaction. Additional detector requirements may include the need for a large area, operability at high count rates, and/or reduced gamma ray background radiation.

Presently, gas proportional counters using helium-3 as the interaction material are the detector of choice in many neutron measurement systems. Helium-3 provides for stable and efficient neutron conversion. However, there is severe shortage of available helium-3, with some estimates indicating that the supply will last less than 30 years. Department of Energy facilities utilizing neutron detection technology, such as the Spallation Neutron Source (SNS) facility are especially concerned with the shortage of available helium-3, particularly in light of their need for large detection areas. Instruments at SNS, such as the Fine-Resolution Fermi Chopper Spectrometer (SEQUOIA) require greater than thirty square meters of detection area, as well as systems having high efficiency, high count-rate, and very low gamma background capabilities.

Another type interaction material is enriched boron, such as boron-10 (e.g., boron enriched beyond 20%), which has 72% the neutron cross section as helium-3. Indeed, use of boron-10 in lining detector surfaces is known in the art. Frequently, boron-10 lined proportional detector tubes are grouped in clusters, and have recently began exhibiting neutron efficiency characteristics similar to those of helium-3 detectors largely due to the increased surface area of boron-10 for detecting the neutron reactions. However, using clusters of boron-10 lined detector tubes is not suitable for position resolution, timing resolution, or count-rate requirements for most neutron scattering applications.

In light of the above, there presently exists a need in the art for a neutron detection system suitable for position resolution, timing resolution, and high count-rate operability. The present general inventive concept provides a solution in the form of individual pixel-cell chambers lined with an interaction material, which will provide numerous advantages over the prior art in the areas of detector volume capability and required expenditures. It is noted that the present general inventive concept will accommodate a wide range of neutron measurement applications.

BRIEF SUMMARY

The present general inventive concept provides a pixilated neutron detector using an interaction material, such as helium-3, lithium-6, boron-10, boron-trifluoride ("BF-3"), and/or fissile uranium. It will be noted that the phrase "interaction materials" will refer to any and all of the above-mentioned materials for purposes of the present application. Further, the discussion of one material, such as boron-10, will also refer to any and all of the other above-mentioned materials for purposes of the present application unless otherwise specified.

According to various embodiments of the present general inventive concept, a pixilated neutron detector may include an array of one or more pixel-cells defined by a plurality of perimeter walls, the pixel cells including a cathode and an anode, the cathode being at least one wall of the pixel-cell lined with any interaction material (e.g., boron-10). The anode is disposed inside the pixel-cell (e.g., in the center of the cell), and in concert with the cathode, provides an electrical field within the pixel-cell to collect charged particles released by neutrons interacting with the interaction material lining. A signal processing chain is communicably coupled to each of the one or more pixel cells to transmit a signal indicative of a neutron interaction event within the pixel-cell. The signal processing chain may include analog signal processing electronics communicably coupled to digital signal processing electronics.

Additional aspects and advantages of the present general inventive concept will be set forth in part in the description which follows, and, in part, will be obvious from the description, or may be learned by practice of the present general inventive concept.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 3 illustrates a front view of an example embodiment neutron detector having an eight by eight pixel-cell detector array;

FIG. 4a illustrates a representative diagram of the electronic processing chains of the example embodiment neutron detector of FIG. 3;

FIG. 4b illustrates a cross sectional view of the example embodiment neutron detector of FIG. 3 taken along cutting line 4;

FIG. 4c illustrates an enlargement of part of the cross sectional area of FIG. 4b taken inside the circular area C;

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

In accordance with various embodiments of the present general inventive concept, a pixilated neutron detector may include a set of small, individual pixel-cell neutron detectors coupled to signal processing electronics. Each pixel-cell detector may have its own analog signal processing chain and each pixel-cell detector may operate independently from other pixel-cell detectors. While each pixel cell chamber includes a defined structural perimeter, a plurality of individual pixel cell chambers may nonetheless be commonly housed within a common gas boundary. Neutron reactions in the pixel-cell detectors occur on a random basis and each valid interaction event produces a logic output signal from the analog electronics. Digital signal processing electronics may synchronize the random neutron pulses from each detector by latching them into a storage medium, such as a temporary memory bank, using a reference time base. If a valid interaction event occurs in any pixel-cell, a snapshot of the data in the storage medium may be latched and presented to the user.

Figure 1A:
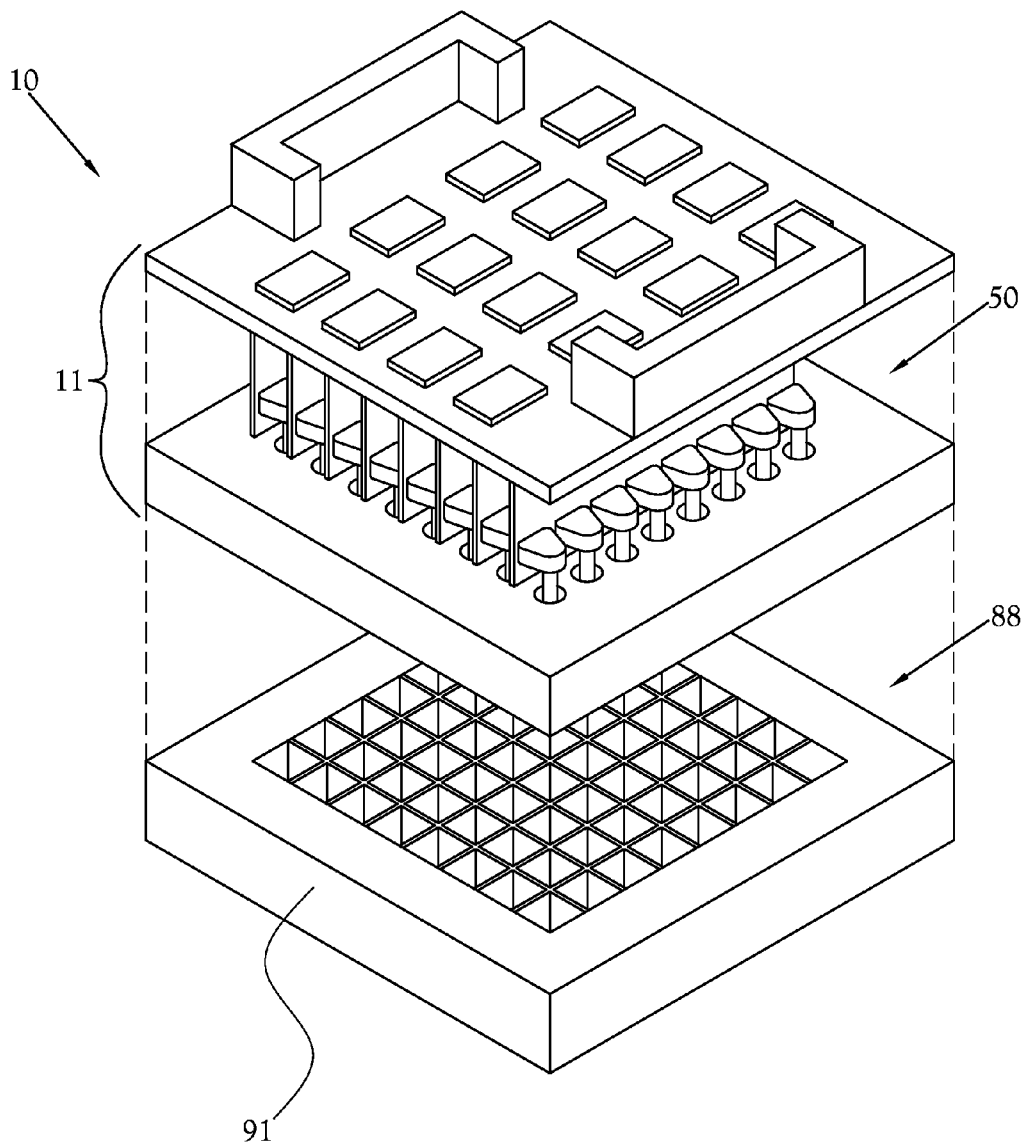
FIG. 1a illustrates an exploded view of an example embodiment pixilated neutron detector.

FIG. 1a illustrates an exploded view of an example embodiment pixilated neutron detector 10. As illustrated, an eight by eight pixel-cell array 88 is contained within a common gas boundary 91 and coupled to signal processing electronics 50. More particularly, each pixel-cell is independently coupled to its own signal processing chain, all of which are commonly housed inside the detector housing 11. As illustrated, the signal processing chains are shown generally at 50 in FIG. 1a (and in more detail, at 50A in FIG. 4a) are include both analog and digital signal processing electronics. The analog signal processing electronics detect the charged particles resulting from the interaction of a neutron with the boron-10 lining. The analog electronics may include a preamplifier, amplifier and a discriminator adapted to provide a signal that occurs at the time of the interaction of the neutron with the interaction material lining. The digital signal processing electronics capture the outputs of all the pixel-cell detectors as a function of time. Using a reference time base, the logic pulses from each pixel-cell are latched into a computer readable storage medium to produce a snapshot of total valid detector activity. The timing accuracy of this snapshot is set by the frequency of the reference time base.

Figure 1B:
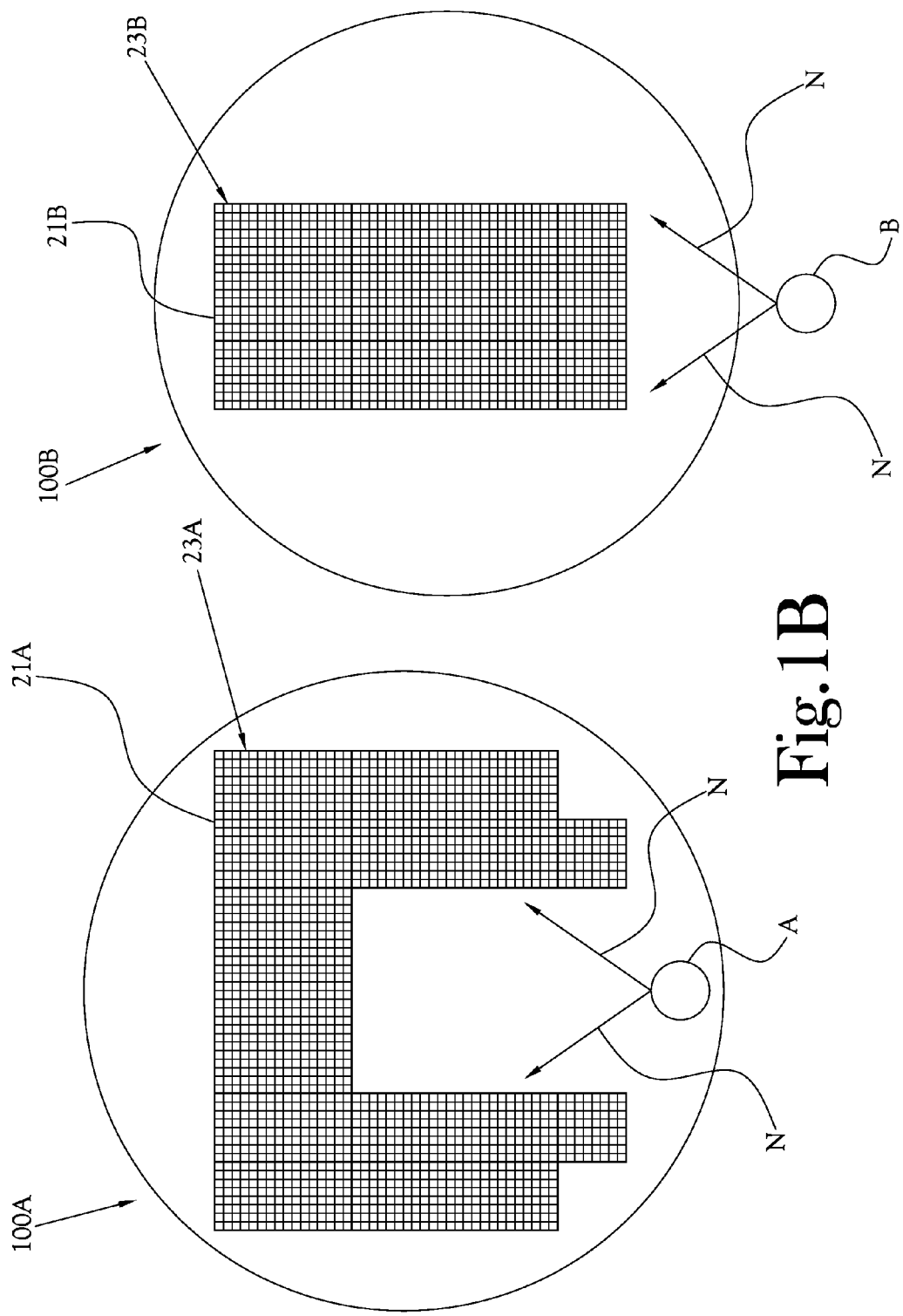
FIG. 1b illustrates a top down view of two example embodiment pixilated neutron detector systems each including a plurality of neutron detector arrays therein.

One of skill in the art will recognize that the presently illustrated example embodiment detector 10 may be further incorporated into a broader neutron detection system, such as that illustrated in FIG. 1b, whereby a readable output unit (not illustrated, but of the type commonly known in the art) is communicably coupled to one or more detectors to provide information regarding the detectors' activity. Because each pixel cell is an independent detector in and of itself, there is no fundamental limit to the total detection area. This is a specific advantage for laboratories such as SNS conducting large scale neutron scattering operations. Further, Homeland Security inspection stations require large area neutron detectors for the detection of illicit nuclear materials. As illustrated in FIG. 1b, an example embodiment neutron detection system 100A, 100B may include an outer perimeter 21A, 21B with various neutron detector arrays 23A, 23B disposed therein. In some embodiments, the system is structured to detect neutron generating materials (as illustrated at "A" and "B" in the figure) such that any emitted neutrons "N" therefrom encounter the plurality of detector arrays. One of skill in the art will note that the present general inventive concept is capable of detecting multiple neutron interactions simultaneously in any two or more pixel cells. It will be noted that while FIG. 1b only shows two different embodiments, one of skill in the art will recognize that an unlimited number of geometrical layouts may be employed for the pixel cell arrays, detectors schemes, and/or perimeters without departing from the scope or spirit of the present invention.

Figure 2:
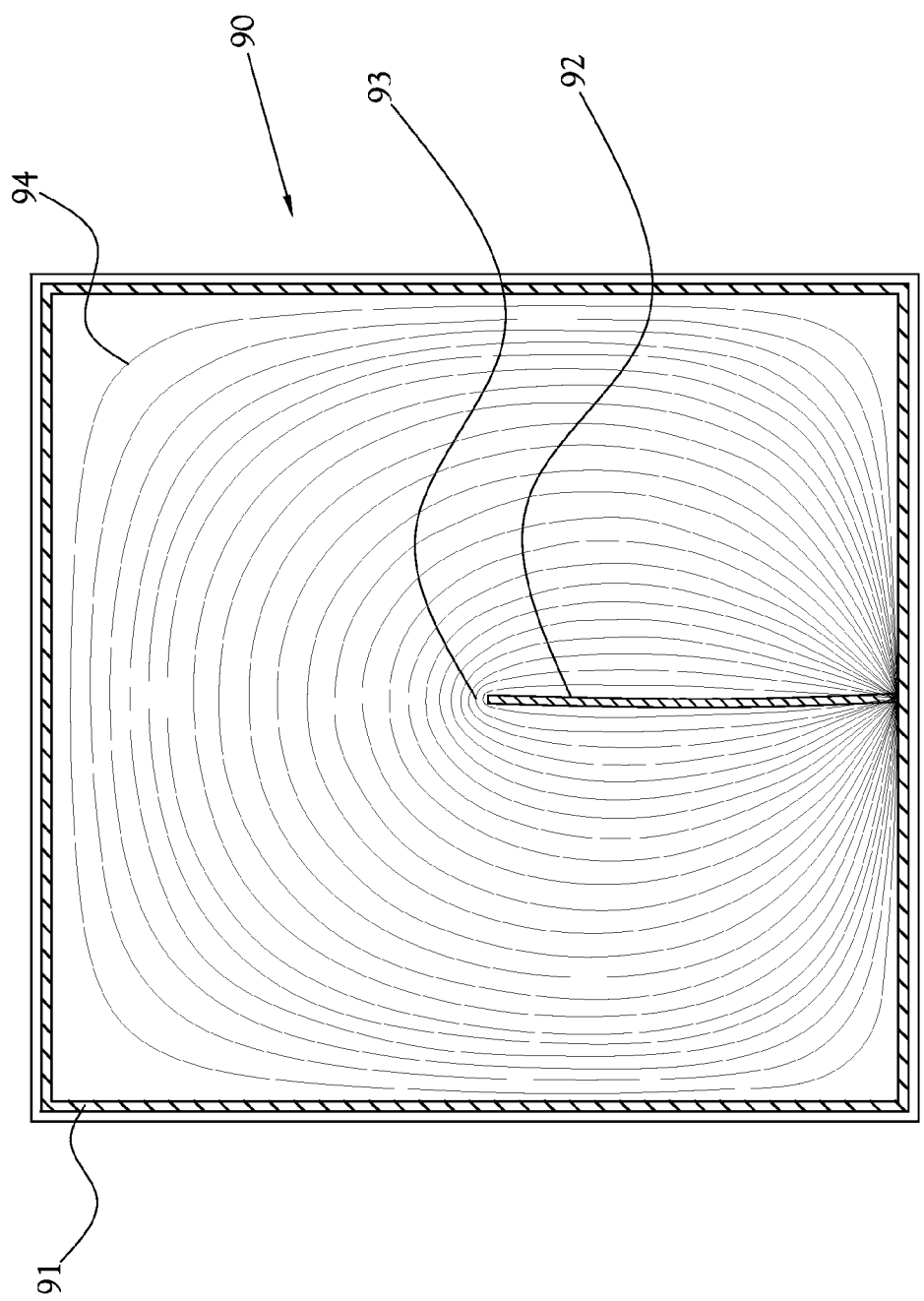
FIG. 2 illustrates an example embodiment pixel-cell with an activated electrical field.

FIG. 2 illustrates an example embodiment pixel-cell 90 with an activated electrical field. In some embodiments, the pixel cells each contain five perimeter walls—a rear wall, from which the anode 92 is projecting, and four walls extending perpendicularly from each edge of the rear wall. In some embodiments, the perimeter walls are thin, metal partitions (e.g., aluminum). One of skill in the art will recognize that a plurality of materials may be used to define the pixel cell perimeter walls, so long as they are capable of creating a bias voltage with the anode (discussed below).

At least one, and in some embodiments each, of the perimeter walls 91 of the pixel-cell are coated with a thin layer of interaction material (e.g., boron-10). The walls 91 serve as the cathode of the detector. It will be noted that the walls 91 of each cell may be scored or otherwise altered to increase the surface area thereof, and in turn, increase the likelihood of interaction. A thin wire or pin is provided to the substantial center of the cell, which serves as the anode 92 of the detector. A bias voltage 93 is applied between the anode 92 and cathode 91 to create an electrical field 94 to attract and collect charged particles released by the interactions between neutrons and the interaction material lining. Charged particles emitted by the reactions (e.g., $^{10}B(n,\alpha)$) are easily detected within the pixel-cell chamber 90 because the Q-value of the reaction, which determines the amount of energy liberated following neutron capture, is very large (2.310 or 2.702 MeV). However, due to self-absorption of the charged particles within the thickness of the interaction material, the interaction material thickness must be kept very thin. Because the maximum range of the charge particles is on the order of 1 mg/cm$^2$, the thermal neutron efficiency cannot be increased simply by increasing the thickness of the interaction material lining.

In some embodiments, the efficiency of the pixel-cell detector may be increased by adding additional surfaces lined with interaction material, such as mesh, plates, baffles, or a porous aerogel within the pixel-cell. Use of these additional surface components may increase the efficiency of the detector while also avoiding self-absorption issues. For instance, a mesh arrangement will increase the neutron conversion efficiency area by 50% without affecting the charge collection efficiency of the pixel-cell chamber.

FIG. 3 illustrates a front view of an example embodiment pixilated neutron detector having an eight by eight pixel-cell detector array 88, with each pixel cell being contained within a common gas boundary 91. One of skill in the art will recognize, however, that each pixel cell may independently comprise a gas boundary itself, without departing from the broader scope or spirit of the present general inventive concept. In one example embodiment, each pixel-cell 90A is no greater than 1 cm×1 cm×1 cm resulting is a 1 cm$^3$ detector volume. This gives a position resolution of 1 cm for the detection of a neutron. In these embodiments, the anode 92A may be substantially 0.01 cm in diameter, 0.5 cm in length, and disposed at the approximate center of the pixel-cell 90A. However, the present general inventive concept is not limited to the example dimensions provided herein. Accordingly, the example embodiment dimensions herein may be increased or decreased without departing from the scope or spirit of the present general inventive concept. Moreover, the example embodiments discussed herein regarding the anode 92A are non-limiting, and may be modified without departing from the scope or spirit of the present general inventive concept. For instance, the anode may extend past the substantial middle of the pixel cell.

One of skill in the art will recognize that the size of each pixel-cell directly affects the position resolution of the detector. Because each pixel-cell is an independent detector, the position resolution is fixed by the size of the pixel-cell without the need for additional position encoding. Smaller size pixel-cells give finer position resolution as well as reduced gamma ray background.

FIG. 4a illustrates a representative diagram depicting signal processing chains of the example embodiment neutron detector of FIG. 3. The components of the example embodiment pixilated neutron detector include a pixel-cell 90A, an anode 92A, a preamplifier 51A, an amplifier/discriminator 53A, and digital signal processing electronics 55. The preamplifier 51A, such as a charge-sensitive preamplifier, is communicably coupled to the pixel-cell anode 92A and converts the energy liberated by the neutron interaction into a voltage pulse. The amplifier/discriminator 53A is communicably coupled to the preamplifier 51A, where it receives the signal from the preamplifier 51A, bolsters the signal strength, and optionally filters it to enhance performance. The amplifier/discriminator 53A also produces a logic pulse if the signal meets certain requirements, such as exceeding a predetermined threshold value. Thus, one of skill in the art will recognize that an interaction event will produce a signal that is propagated along the signal processing chain 50A, which may include a preamplifier 51A communicably coupled to the pixel-cell anode 92A and to an amplifier/discriminator 53A, which is communicably coupled to signal processing electronics 55.

Because the volume of each pixel cell is very small, the gamma ray interaction is kept to a minimum for each neutron interaction volume. This innovative feature significantly reduces the background counts caused by losses in gamma ray energy. The discrimination of unwanted gamma ray background noise in the present general inventive concept is significantly improved over a typical tube detector with a single large detecting volume.

Due to the self-absorption of charged particles within the thickness of the interaction material (e.g., boron-10), the efficiency increases as the threshold values decrease. Therefore, lower threshold values of the pixel cell detector are very advantageous. A typical threshold value for the present general inventive concept is set just above the electronic noise level of the system and in the valley between the maximum energy deposited by gamma rays and the minimum energy expected from a neutron interaction event. For a helium-3 filled detector array, this value may be set between 60 and 150 keV.

The digital signal processing electronics (e.g., a digital processor) depicted in FIG. 4a, capture the outputs of all the pixel-cell chambers as a function of time. Using a reference time base, the logic pulses from each pixel-cell are latched and/or recorded into a computer readable storage medium to produce a snapshot of the total valid detector activity. The timing accuracy of this snapshot is set by the frequency of the reference time base. For example, a 10 MHz reference time base would provide a timing accuracy of 100 ns. Each timed snapshot can be provided to a storage medium such as a first-in, first-out memory bank (hereinafter "FIFO memory") followed by high-speed data transmission to a central computer.

FIG. 4b is a cross-sectional view of the example embodiment detector of FIG. 3 taken along cutting line 4. As shown, each pixel cell 90A is coupled to a signal processing chain housed within the detector housing 11A. Shown at the rear of the detector are data, time, and power connectors 61A-C that are included in the digital electronics of the signal processing chain.

FIG. 4c is an enlargement of part of the cross sectional area of FIG. 4b taken inside the 4c circular area. As illustrated in the example embodiment, each pixel cell 90A includes an anode 92A coupled to a signal processing chain. The anode 92A is mounted in position using a signal connector 69A, which may also communicably couple the charged anode with the signal processing electronics. An insulator 67A serves to insulate the charged pixel cell 90A and included anode 92A from the remaining detector components. In some embodiments, the insulator 67A may also be one of the defined perimeter walls of the pixel cell 90A.

Still referring to FIG. 4c, the common gas boundary 91A is circumferentially provided to the detector in order to create a gas chamber for the pixel cells 90A. A flange 63 and seal 65 may also be provided to interpose the common gas boundary 91A and the detector housing 11 so as to hermetically seal the pixel cell array 88 (see FIG. 3). In some embodiments, the seal 65 is a metal grommet and/or a rubber O-ring.

Figure 5A:
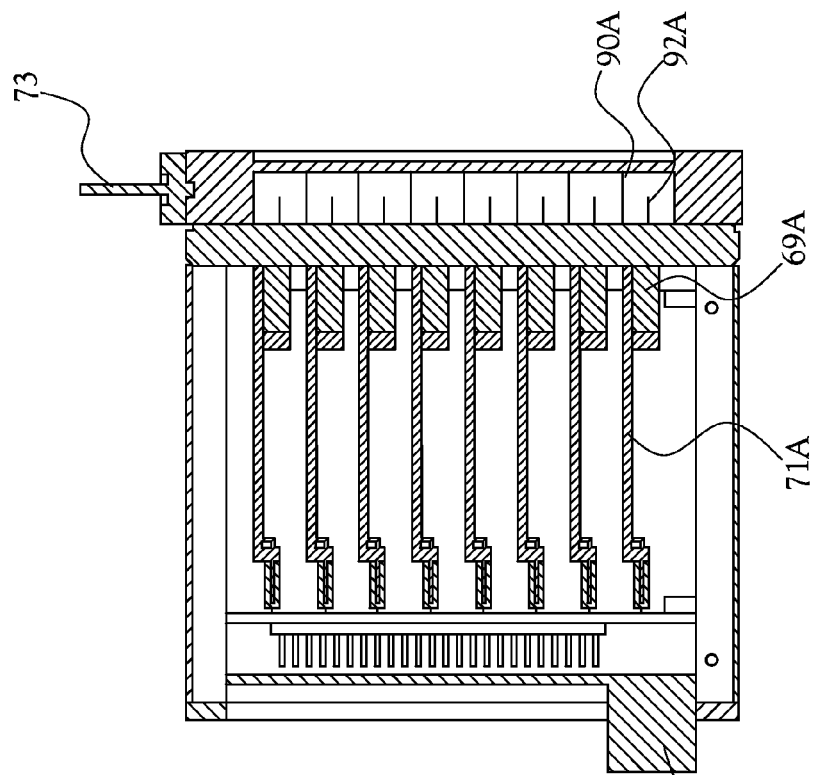
FIG. 5a illustrates a side view of the example embodiment neutron detector of FIG. 3.
Figure 5B:
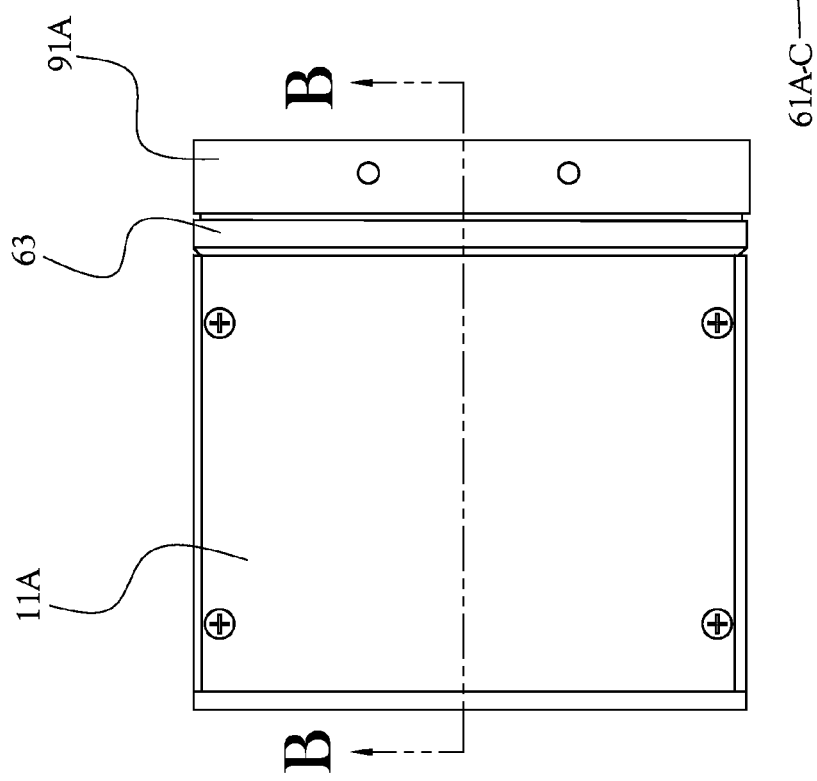
FIG. 5b illustrates a cross-sectional view of the example embodiment neutron detector of FIG. 5a taken along cutting line B.

FIG. 5a illustrates an exterior side view of the example embodiment neutron detector of FIG. 3. As illustrated, the detector housing 11A and gas boundary 91A are interposed by a flange 63. FIG. 5b is a cross-sectional view of the example embodiment neutron detector of FIG. 5a taken along cutting line B. The illustrated example embodiment includes a pixel cell 90A with an anode 92A mounted in place using a signal connector such that the charges occurring in the anode may be propagated along the signal processing chain. The signal processing chain includes a printed circuit board 71A in electrical communication with the data, power, and time connectors illustrated at 61A-C.

Still referring to FIG. 5a, a gas inlet port 73 is provided proximate the gas boundary 91A such that the port 73 is in fluid communication with an interior of the boundary 91A (i.e., the pixel cell array). Accordingly, gaseous materials (e.g., helium, argon gas, carbon dioxide, BF-3, etc.) may be selectively introduced into the chamber/array volume. In some embodiments, the pixel-cells are filled with a suitable proportional gas, such as argon gas, that permits fast timing and reduced gamma ray interaction. Indeed, one advantage of the present general inventive concept is that by reducing the size of the pixel-cells, the amount of gas needed to fill the volume is reduced. This is advantageous in reducing gamma ray interactions and preventing a phenomenon commonly referred to as "pulse pile up." Generally, gamma rays interact with both the interaction material lining and the counting gas. In conventional neutron detector systems, the gamma ray interactions may produce pulses that are large enough to be processed by the electronics and, as a result, interfere with the efficiency of the system. By reducing the active volume of counting gas to that of a pixel cell, the number of gamma ray interactions is reduced, as is the occurrence of pulse pile up events. For example, pixel-cell volumes of one cubic centimeter greatly decrease the probability of gamma rays or other types of undesirable energy deposits within each pixel cell detector.

There are no required components for the pixel-cells other than the walls with interaction material lining in the active detection area and a small charge collection anode disposed in the pixel-cell. The electronics for each pixel-cell chamber consists of its own individual channel of analog pulse processing electronics followed by digital processing electronics. As previously discussed, because each pixel-cell is an independent detector, one of skill in the art will recognize that no position decoding is required. The digital processing electronics synchronize the random neutron pulses for each detector with a reference time base and determine when valid neutron interaction events occur in a pixel-cell. If a valid event occurs in any pixel-cell, a snapshot is provided to a FIFO memory, followed by high-speed serialization for data transmission to the interface electronics at the main control console or other readable output unit.

The present general inventive concept is designed to maximize neutron detection efficiency while reducing unwanted background counts from gamma interactions. The pixel-cell ionization chambers, when lined with an interaction material, provide substantially more surface area per cell volume for neutron conversion than traditional tube detectors. Some advantages of this aspect include (a) the energy released in the $^{10}B(n,\alpha)$ reaction produces pulses of sufficient magnitude to be detected without high gas gain; (b) the operating bias voltage is lower, which simplifies insulator and feed-through constructions; (c) gas purity is not critical: and (d) the charge-collection occurs faster.

As discussed above, the present general inventive concept also improves signal-to-noise ratio. Compared to single wire tube-type proportional counters with a single active detection volume, a gamma ray must lose significantly more energy to be counted as an interaction event in a pixilated neutron detector according to various example embodiments of the present general inventive concept. This reduces background counts caused by a gamma ray energy loss significantly more so than a typical tube detector volume.

Yet another advantageous aspect of the present general inventive concept is enhanced spatial resolution. The pixel-cell design makes the spatial resolution in any dimension independent of the overall detector dimensions. Each pixel-cell is a fully instrumented resolution element independent of any other pixel-cell within the detector. Therefore, no special electronics scheme is required to determine the position/location of the interaction event. Neutron interaction events captured in a pixel-cell will only produce a charge in that cell. The spatial resolution is defined by the size of the pixel-cell. Thus, designs with smaller pixel cell volumes will provide for greater spatial resolution.

The present general inventive concept, according to various example embodiments thereof, may also include a method of making a pixilated neutron detector. In some embodiments, the method includes the operations of defining a pixel-cell detection array, the array including a plurality of individual and uniform cells each comprising at least five perimeter walls (e.g., six perimeter walls in some embodiments); providing to each cell an anode originating in one of the perimeter walls and structured to cooperate with at least one of the perimeter walls such that an electrical field may be created in each cell; lining at least one of the at least five perimeter walls with an interaction material; communicably coupling the anode of each cell to an analog processing chain such that interaction events in each cell may be detected and a corresponding signal may be propagated; communicably coupling each analog processing chain to a digital processor to receive the propagated signal and process each interaction event from each cell as a function of time; and providing a storage medium in communication with the digital processor such that each timed interaction event may be recorded. Further, in some embodiments, the operation of defining a pixel cell detection array includes establishing a gas boundary around a perimeter of the array to hermetically seal the array.

Example embodiments of the present general inventive concept may also include a pixilated neutron detection system. In some embodiments, the system includes a plurality of detection arrays, each including two or more individual and uniform pixel cells, each pixel cell defined by at least five perimeter walls with at least one wall being lined with an interaction material, each pixel cell including an anode disposed inside the pixel cell and coupled to an electrical source, each pixel cell including a cathode, the cathode being at least one of the at least five perimeter walls of the pixel cell, the cathode being lined with an interaction material, the cathode and anode structured to provide an electrical field within the pixel cell to collect charged particles released by neutrons interacting with the interaction material lining; a plurality of individual analog signal processing chains communicably coupled to each pixel cell; a digital processor provided with a storage medium communicably coupled to each analog signal processing chain; and a central control unit having a means to output data communicably coupled to the digital processor. Further, in some embodiments, an individual digital processor is provided to each one of the plurality of detection arrays.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A pixilated neutron detector comprising:
one or more pixel cells each defined by a plurality of perimeter walls with at least one wall being lined with an interaction material, each pixel cell sharing a common perimeter wall with any adjacent pixel cell, each pixel cell including a cathode being at least one wall and an anode disposed therein, the anode extending through only one of the perimeter walls, the cathode and anode structured to cooperatively provide an electrical field within the pixel cell to collect charged particles released by neutrons interacting with the interaction material;
a signal processing chain communicably coupled to each of the one or more pixel cells to transmit a signal indicative of a neutron interaction event within the pixel-cell, the signal processing chain including analog signal processing electronics communicably coupled to digital signal processing electronics wherein the signal indicative of a neutron interaction event within the pixel-cell provides positional data for a neutron interaction event without further position decoding.

2. The pixilated neutron detector of claim 1, wherein the signal processing chain includes analog signal processing electronics exclusive to each of the one or more pixel cells.

3. The pixilated neutron detector of claim 2, wherein the analog signal processing electronics include a preamplifier to generate a signal based on the neutron interaction event, the preamplifier communicably coupled to an amplifier to bolster the strength of the signal, the amplifier communicably coupled to a discriminator to generate a logic pulse if the amplifier output signal exceeds a pre-set threshold, the discriminator communicably coupled to the digital processing electronics.

4. The pixilated neutron detector of claim 3, wherein the pre-set threshold is between 60 and 150 keV to discriminate background events from neutron signals or events.

5. The pixilated neutron detector of claim 3, wherein the amplifier also filters the signal.

6. The pixilated neutron detector of claim 1, wherein the digital signal processing electronics receive the signal from the analog processing electronics and convert the signal into a function of time, the digital signal processing electronics including a storage medium to receive signal information.

7. The pixilated neutron detector of claim 1, wherein the one or more pixel-cells further include mesh, plates, baffles, aerogel, or any combination thereof, disposed therein and lined with interaction material.

8. The pixilated neutron detector of claim 1, wherein each of the one or more pixel-cells are no greater than one cubic centimeter.

9. The pixilated neutron detector of claim 1, wherein the anode is disposed substantially within a center of the one or more pixel cells.

10. The pixilated neutron detector of claim 1, wherein the interaction material includes helium-3, lithium-6, boron-10, boron-trifluoride, fissile uranium, or any combination thereof.

11. The pixilated neutron detector of claim 1, wherein the one or more pixel cells includes an array of at least two pixel cells; and further comprising a common gas boundary including a gas sealing means provided to the perimeter of the array and a gas inlet port in fluid communication with the array.

12. The pixilated neutron detector of claim 11, wherein the interaction material includes boron-10 and the array of at least two pixel cells is provided with argon gas.

13. The pixilated neutron detector of claim 11, wherein the interaction material includes helium-3 gas provided to the array of at least two pixel cells.

14. The pixilated neutron detector of claim 1, wherein the one or more pixel cells are each defined by at least five walls, wherein at least one wall of the at least five walls defining the one or more pixel-cells lies in a plane substantially transverse to the anode.

15. The pixilated neutron detector of claim 1, wherein the one or more pixel cells are uniform.

16. The pixilated neutron detector of claim 15, wherein the one or more uniform pixel cells are substantially cube shaped.

17. A method for making a pixilated neutron detector, the method comprising:
defining a pixel-cell detection array, the array including a plurality of individual and uniform cells each comprising at least five perimeter walls, each cell sharing a common perimeter wall with any adjacent cell;
providing to each cell an anode originating in one of the at least five perimeter walls and structured to cooperate with at least one of the at least five perimeter walls such that an electrical field may be created in each cell;
lining at least one of the at least five perimeter walls with an interaction material;
communicably coupling the anode of each cell to an analog processing chain such that interaction events in each cell may be detected and a corresponding signal may be propagated;
communicably coupling each analog processing chain to a digital processor to receive the propagated signal and process each interaction event from each cell as a function of time; and
providing a storage medium in communication with the digital processor such that each timed interaction event may be recorded.

18. The method of claim 17, wherein the operation of defining a pixel cell detection array includes establishing a gas boundary around a perimeter of the array to hermetically seal the array.

19. A pixilated neutron detection system comprising:
a plurality of detection arrays, each including two or more individual and uniform pixel cells, each pixel cell defined by at least five perimeter walls with at least one wall being lined with an interaction material, each pixel cell sharing a common perimeter wall with any adjacent pixel cell, each pixel cell including an anode disposed inside the pixel cell and coupled to an electrical source, each pixel cell including a cathode, the cathode being at least one of the at least five perimeter walls of the pixel cell, the cathode being lined with an interaction material, the cathode and anode structured to provide an electrical field within the pixel cell to collect charged particles released by neutrons interacting with the interaction material lining;
a plurality of individual analog signal processing chains communicably coupled to each pixel cell to transmit a signal indicative of a neutron interaction event within the pixel cell, wherein the signal indicative of a neutron interaction event within the pixel-cell provides positional data for a neutron interaction event without further position decoding;
a digital processor provided with a storage medium communicably coupled to each analog signal processing chain; and a central control unit having a means to output data communicably coupled to the digital processor.

20. The neutron detection system of claim 19, wherein an individual digital processor is provided to each one of the plurality of detection arrays.

* * * * *